(12) United States Patent
Aykac et al.

(10) Patent No.: US 10,353,087 B1
(45) Date of Patent: Jul. 16, 2019

(54) COINCIDENCE CIRCUIT WITH SPLITTER

(71) Applicant: Siemens Medical Solutions USA, Inc., Malvern, PA (US)

(72) Inventors: Mehmet Aykac, Knoxville, TN (US); Vladimir Y. Panin, Knoxville, TN (US); Andrew Philip Moor, Knoxville, TN (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 0 days.

(21) Appl. No.: 15/955,119

(22) Filed: Apr. 17, 2018

(51) Int. Cl.
   *G01T 1/20* (2006.01)
   *G01T 1/29* (2006.01)
(52) U.S. Cl.
   CPC .................. *G01T 1/2985* (2013.01)
(58) Field of Classification Search
   CPC ...... G01T 1/2006; G01T 1/2018; G01T 1/202
   See application file for complete search history.

(56) References Cited

U.S. PATENT DOCUMENTS

| 4,463,263 | A | 7/1984 | Padawer |
| 4,980,552 | A | 12/1990 | Cho et al. |
| 5,241,181 | A | 8/1993 | Mertens et al. |
| 6,255,655 | B1 | 7/2001 | McCroskey et al. |
| 6,774,370 | B1 | 8/2004 | Uchida et al. |
| 7,381,960 | B1 | 7/2008 | Chuang |
| 2004/0036025 | A1* | 2/2004 | Wong .................. G01T 1/1642 250/363.09 |
| 2015/0001399 | A1* | 1/2015 | Fries .................... G01T 1/2985 250/362 |
| 2018/0114345 | A1* | 4/2018 | Liu ........................ G06T 11/005 |

\* cited by examiner

*Primary Examiner* — David P Porta
*Assistant Examiner* — Mamadou Faye

(57) ABSTRACT

A method comprises: detecting a plurality of radiation events using a plurality of radiation detectors; determining a fraction of the plurality of radiation events, such that a coincidence circuit has sufficient capacity to process each radiation event in the fraction of the plurality of radiation events; counting the determined fraction of the plurality of radiation events using the coincidence circuit, and excluding a remainder of the plurality of radiation events from the counting; and performing positron emission tomography (PET) processing on each radiation event in the fraction of the plurality of radiation events.

14 Claims, 8 Drawing Sheets

COINCIDENCE CIRCUIT WITH SPLITTER

FIELD

This disclosure relates to medical imaging equipment.

BACKGROUND

Positron emission tomography (PET) includes injection of a radiopharmaceutical into a patient, and scanning the patient. The decay of the radiopharmaceutical produces positrons. When a positron meets an electron, an annihilation event occurs, emitting two gamma rays in opposite directions. The scanner has multiple rings of scintillators, which capture the annihilation photons emitted from a patient or subject. An array of detectors detect the photons and outputs signals indicating the energy and the time at which the detector detects the photons.

Annihilation events can be categorized as "prompts" or "randoms". If the leading edges of the two time marks both occur within a "coincidence window" (e.g., typically about 4.0 to 4.2 nanoseconds, depending on the size of the scanner and detector time resolution), the two detections are considered to be produced by a single annihilation event, and indicate a prompt event. Prompt events also include random events that are not generated from one annihilation point. In order to measure the random events, one can implement a delay circuitry. In this circuitry, signals corresponding to one of the annihilation events are delayed much longer than the coincidence window so that any coincidence detection in this part of the electronics will be accidental. These detections will be considered as random events. "True" coincidence events are the difference between prompt events and random events.

A PET system includes a coincidence circuit for determining whether a pair of received signals indicate a prompt coincidence event or a random event.

SUMMARY

In some embodiments, a method comprises: detecting a plurality of radiation events using a plurality of radiation detectors; determining a fraction of the plurality of radiation events, such that a coincidence circuit has sufficient capacity to process each radiation event in the fraction of the plurality of radiation events; counting the determined fraction of the plurality of radiation events using the coincidence circuit, and excluding a remainder of the plurality of radiation events from the counting; and performing positron emission tomography (PET) processing on each radiation event in the fraction of the plurality of radiation events.

In some embodiments, a method comprises: determining a fraction of random radiation events to be processed; detecting a first set of radiation events, each including two photons separated by up to a threshold amount of time, and a second set of random radiation events, where a coincidence circuit has sufficient buffer capacity to process each radiation event in the first set of radiation events and the fraction of the second set of random radiation events; counting the first set of radiation events and the fraction of the second set of random radiation events using the coincidence circuit, and excluding a remainder of the second set of random radiation events from the counting; and performing positron emission tomography (PET) processing on each radiation event in the first set of radiation events and the fraction of the second set of random radiation events.

In some embodiments, a coincidence circuit comprises a plurality of coincidence nodes. Each coincidence node is coupled to receive respective signals from a respective pair of radiation detectors for detecting a plurality of radiation events, and for outputting event data corresponding to each radiation event based on the received signals. Each of a plurality of splitters is configured for receiving the event data from a respective one of the plurality of coincidence nodes and outputting the event data corresponding to a fraction of the radiation events. Each of a plurality of buffers is configured for storing the event data corresponding to a first predetermined number of radiation events from a respective one of the plurality of splitters. An output buffer is coupled to the plurality of buffers, for receiving, storing and outputting a second predetermined number of the event data from one or more of the plurality of buffers for image reconstruction. A circuit is provided for incrementing a count in a loss counter in response to determining that the output buffer is full and event data from one of the plurality of buffers is available at an input of the output buffer, wherein the fraction is selectable so the count does not exceed a predetermined threshold criterion.

DETAILED DESCRIPTION

This description of the exemplary embodiments is intended to be read in connection with the accompanying drawings, which are to be considered part of the entire written description. Terms concerning attachments, coupling and the like, such as "connected" and "interconnected," refer to a relationship wherein structures are secured or attached to one another either directly or indirectly through intervening structures, as well as both movable or rigid attachments or relationships, unless expressly described otherwise.

High count rate studies such as Rubidium-82 (Rb-82) cardiac studies, Oxygen-15 (O-15) water brain studies, or the like, use a capability of high speed data transfer. During high activity, detectors and scanner electronics may potentially suffer from count losses. Coincidence circuitry may be a bottleneck of the electronics during high activity periods. For example, if the incoming rate of event data to the coincidence circuit exceeds its output rate, internal buffer space in the coincidence circuit becomes full, and cannot store incoming events as long as the buffer remains full. While the buffer remains full, a substantial fraction of the event data received by the coincidence circuit may be lost, and the counts of prompt coincidence events and random events determined in the coincidence circuit can be inaccurate. If the count of prompts or randoms is inaccurate, the calculated count of trues can also be inaccurate.

Figure 1:
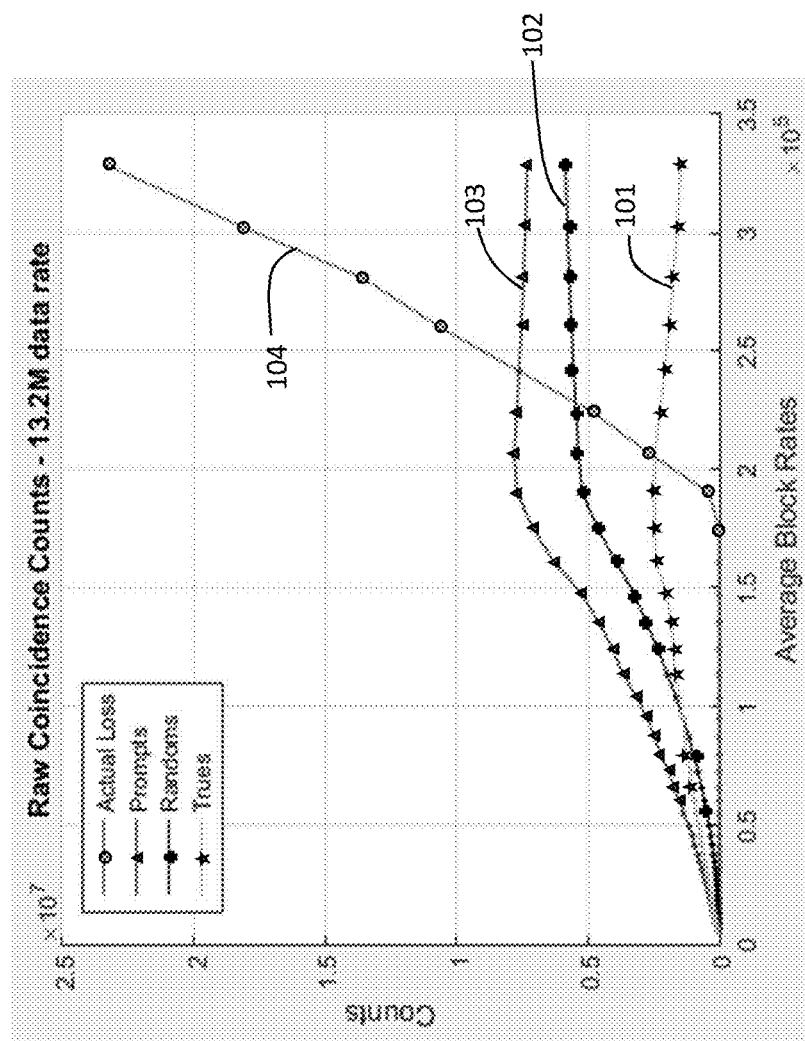
FIG. 1 is a diagram showing count performance of prompts, randoms, trues and loss events for a decaying water cylinder with F18 at 13.5 Million events per sec (Mcps) data transfer rate.

FIG. 1 is a schematic diagram showing raw coincidence counts by a coincidence circuit during a PET study, as a function of the event rates input to the coincidence board. Curve 101 indicates true coincidence events. Curve 102 indicates random coincidence events. Curve 103 indicates prompts, which include trues plus randoms. Curve 104 indicates lost event data, as determined by a one global loss counter to account for both prompts and randoms lost events in the coincidence circuit.

In this example, the loss count in curve 104 is zero at block rates below $1.75 \times 10^5$ counts per second (cps), when the data transfer rate is at 13.5 Million events per second. The true coincidence event curve 101 can be described as a linear function, and the random and prompt curves 102, 103 can be described using higher order polynomials. In this example, once the block input rate reaches $1.75 \times 10^5$ cps, the buffers in the coincidence board become full, and the number of lost event data increases sharply. The trues curve 101, randoms curve 203 and prompts curve 103 become inaccurate at input rates above $1.75 \times 10^5$ cps.

To minimize the loss in the coincidence circuit, this disclosure provides a mechanism to consistently process a fraction of prompts and randoms coincidence counts before or inside the coincidence circuit, to prevent or substantially reduce filling of internal buffers. This fraction is referred to herein as the "split ratio". In a similar fashion, this disclosure also provides a mechanism to process prompts and randoms by using first and second "split ratios", respectively, to maximize the qualified coincidence detections.

Figure 2:
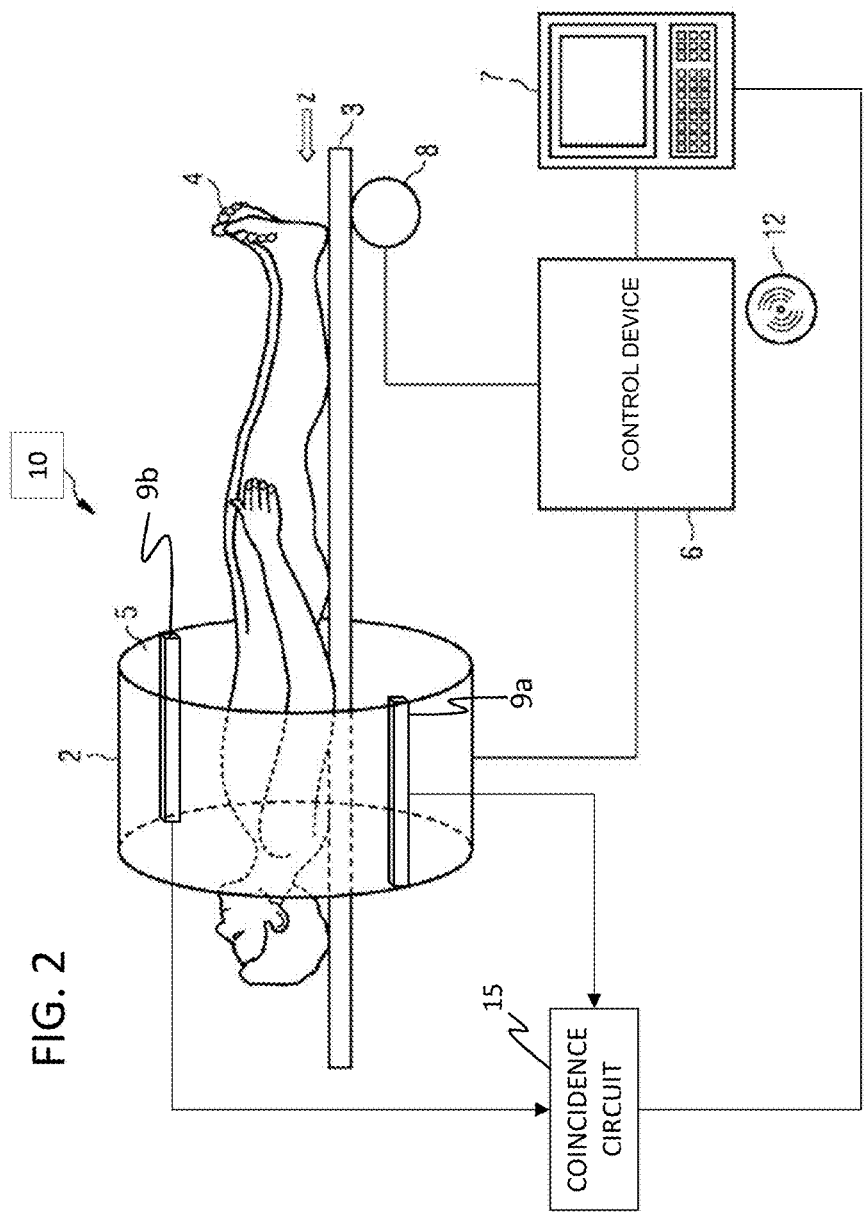
FIG. 2 is a schematic diagram of a PET system according to an exemplary embodiment.

FIG. 2 shows a schematic diagram of a positron emission tomography (PET) system 10. The system 10 comprises: a tomograph 2, an examination table 3 for a patient 4 who can be moved on the examination table 3 through an opening 5 of the tomograph 2. The tomograph 2 also has a control device 6, a processor 7 and a drive unit 8. Positron emitting radiopharmaceutical is injected into the patient's blood vessels. The control device 6 activates the tomograph 2 and receives from the tomograph 2 signals which are formed when the gamma rays impinge on the tomograph 2. With the aid of the tomograph 2 PET sinogram data can be collected. Also disposed in the tomograph 2 is at least one ring of PET detector blocks 9a, 9b (collectively referred to as 9) for acquiring gamma rays (which are created by annihilation of electrons and positrons) in the PET detector blocks 9a, 9b. An annihilation event creates two gamma rays directed about 180 degrees apart. Although only 2 detector blocks 9a, 9b are shown in FIG. 2 for ease of viewing, tomograph 2 can have many detector blocks 9 arranged around the circumference of the tomograph 2. Although FIG. 2 only shows one ring of detector blocks 9, other examples have two or more rings. Each detector block 9 has a plurality of scintillators (not shown), which emit photons when struck by the gamma rays, and photomultiplier tubes (PMT) or silicon photomultipliers (SiPM) (not shown) for detecting the photons emitted by the scintillator and generating signals, proportional to the photon deposition in the array of scintillators, indicating an event detection.

The signals from the detector blocks 9 are provided to the coincidence circuit 15 after being processed in the front end electronics to generate energy signals and time marks. The coincidence circuit 15 determines whether two detection signals from respective detector blocks 9a, 9b fall within a temporal coincidence window to indicate that the two detection signals were both caused by one single annihilation event. For example, the coincidence window may be from 4 to 4.2 nanoseconds for a 70 cm diameter tomograph 2. The coincidence circuit 15 can classify detected photons according to two categories: prompts coincidence events and random coincidence events. A pair of signals separated by a time interval smaller than the coincidence window (e.g., 4.2 nanoseconds) indicate a "prompt coincidence event". The random coincidence events can include two unrelated photon detections. Randoms can be estimated by measuring accurate block singles rate using Equation (1) below. Another method used in this disclosure is to directly measure randoms coincidence events by using a delay coincidence circuitry. Trues are collectively referred to as the difference of "prompts" and "randoms".

$$R = 2 * S_1 * S_2 * \tau \tag{1}$$

where
R: calculated random coincidence rate,
$S_i$: measured singles rates for block i,
$\tau$: coincidence window.

The control device 6 is further operable to receive signals from the detector blocks 9 and is capable of evaluating these signals for creating PET sinogram data and reconstructing PET images. The control device 6 further activates the drive unit 8 in order to move the examination table 3 in a direction Z together with the patient 4 through the opening 5 of the tomograph 2. The control device 6 and the processor 7 can, for example, comprise a computer system with a screen, a keyboard and a storage medium 12 on which electronically-readable control information is stored, which is embodied so that it carries out the method described below when the storage medium 12 is used in the processor 7 and the control device 6.

Figure 3:
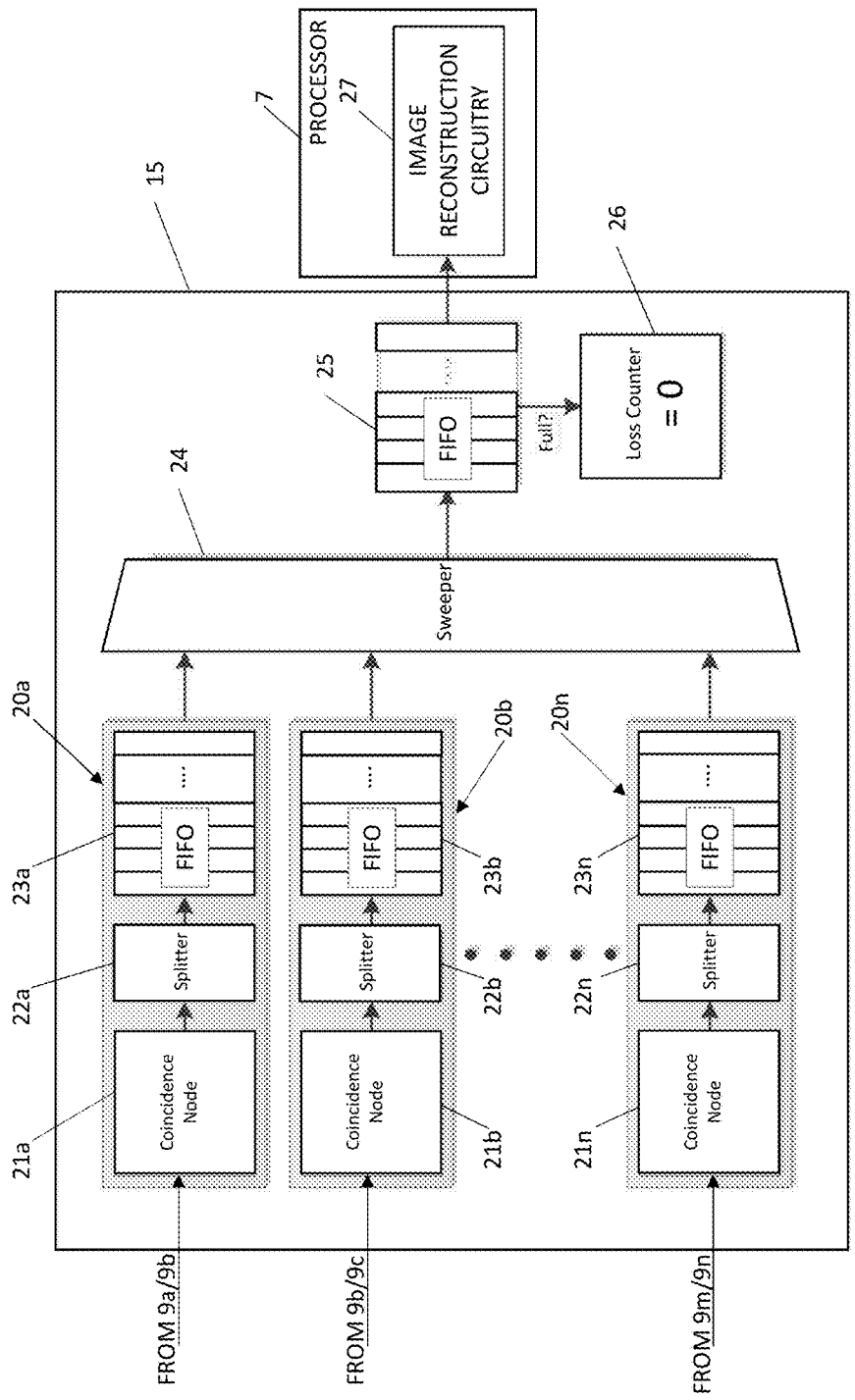
FIG. 3 is a block diagram of the coincidence circuit of FIG. 2.

FIG. 3 is a block diagram of an exemplary coincidence circuit 15. The coincidence circuit 15 has a plurality of coincidence units 20a-20n. Each coincidence unit 20a-20n has a respective coincidence node 21a-21n, a respective splitter 22a-22n, and a respective first-in, first-out (FIFO) buffer 23a-23n. In the discussion below, an example is discussed referencing coincidence node 21a, splitter 22a and FIFO buffer 23a of coincidence unit 20a. This is only exemplary, and the discussion also applies to the other coincidence units 20b-20n. For brevity, the description of the coincidence unit 20a is not repeated for each of the individual coincidence units 20b-20n. In addition, splitter may have respective split ratios for prompts and randoms.

Each coincidence unit 20a-20n corresponds to a respective pair of buckets that are positioned for detecting gamma rays from the same annihilation event. For example, coincidence node 21a can correspond to two buckets of detector blocks 9 positioned 180 degrees apart along the tomograph 2. Other coincidence nodes can correspond to buckets of detector blocks which are less than 180 degrees apart. Each bucket has a plurality of detector blocks (e.g., 9a). In one non-exclusive example, a scanner 10 has four tomograph rings, each ring has 12 buckets, each bucket has four detector blocks, (48 blocks/ring), and each detector block has 169 scintillators (in a 13×13 array).

The coincidence units 20a-20n output data identifying whether incoming signals to a coincidence unit (e.g., 20a) represent prompt coincidence events or random events. A sweeper 24 collects the oldest event data from each FIFO buffer 23a-23n in round-robin fashion and outputs the collected event data to an output buffer 25. The output buffer 25 pushes the energy and time qualified coincidence event data out to a listmode file which may be considered as the initial process for image reconstruction circuitry 27, which can be implemented as software executing on the processor 7, for example.

The coincidence node 21a is coupled to receive respective signals from a respective pair of radiation detectors 9a, 9b for detecting a plurality of radiation events, and for outputting event data corresponding to each radiation event based on the received signals. Each individual coincidence node (e.g., 21a) is configured to determine whether a pair of incoming signals (a "prompt") from a corresponding pair of buckets indicates a pair of gamma rays resulting from a single annihilation (a "true coincident pair") or a pair of random events (a "random"). The coincidence node 21a outputs the event data (indicating whether the detected event is a prompt event or a random) to the splitter 22a. Splitter may have one common split ratio for both prompts and randoms. In another embodiment, splitter may have two different split ratios, including a first split ratio for prompts and a second split ratio for randoms, depending on the study type and/or count rate levels.

In some embodiments, randoms are measured using delayed circuitry. In this scheme, a time mark signal corresponding to one of the annihilation photons is delayed. The same fine time window (e.g., about 4.2 ns) is used to measure both prompts and randoms.

Other techniques can be used to determine whether photons received by a pair of detector blocks and transmitted to a corresponding coincidence node 21a constitute a prompt coincidence event or a random detection.

Each coincidence unit 20a-20n has a respective splitter 22a-22n. Each splitter 22a-22n is configured for receiving the event data from its respective coincidence node 21a-21n and outputting the event data corresponding to a portion of the radiation events to its respective FIFO buffer 23a-23n. In each splitter, prompts and randoms can have respective split ratios, which can differ from each other.

According to one aspect, the splitter 22a can be configured to pass a predetermined portion of the event data from the coincidence node 21a to the FIFO buffer 23a, to reduce the number of event data output from sweeper 24 to output buffer 25 in any given time interval, permitting accurate quantification, even during high activity PET studies. The splitter 22a discards the remaining portion of the event data. As discussed herein, when the splitter 22a discards an event data, the event data are not passed to the FIFO buffer 23a or the output buffer 25, and the loss counter 26 is not incremented. By design, splitter 22a is capable of discarding event data while neither FIFO buffer 23a nor the output buffer 25 is full, whereas the loss counter 26 only increments while the output buffer 25 is full, By discarding prompt and random events in numbers proportional to the actual ratio of prompt events to random events, the ratio of retained prompt events to retained random events can stay substantially the same in the case where a fraction of events are discarded as the ratio would be in the case where the FIFO buffer 25 has unlimited capacity and receives all prompt events and random events. Once a "measured prompt" rate and a "measured random" rate are determined based on the events passed by the splitter 22a, the actual "prompt| rate and actual "random" rate can be determined by scaling the measured values. For example, the splitter passes prompt events (P pass) if the split ratio is set to $S_p$. Therefore, discarded events will simply be $(1-S_p)$ $*P_{tot}$ where $P_{tot}$ are the total prompt events input to the board. Equation 2 shows the basic split formulation. Similarly, randoms can be processed the same way with the same or different split ratio as shown in Equation 3.

$$P_{pass} = S_p * P_{tot} \quad (2)$$

where $P_{tot}$: total number of prompts before the splitter
$P_{pass}$: number of prompts to be processed after the split ratio is applied (after splitter)
$S_p$: constant split ratio for prompts
In a similar fashion, $$R_{pass} = S_R * R_{tot} \quad (3)$$

where $R_{tot}$: total number of randoms before splitter
$R_{pass}$: number of randoms to be processed after the split ratio is applied (after splitter)
$S_R$: constant split ratio for randoms For example, if empirical data show that the entire coincidence circuit 15 loses about 40% of the prompts, splitter 22a can be configured to pass 60% of its received prompts to its respective FIFO buffer 23a and discard the remaining 40% of its received prompts. For example, the splitter 22a can pass the event data for six events and discard the event data for the next four events, and repeat for the next ten events. The actual prompt rate can be recovered from the measured prompt rate by dividing the measured prompt rate by 0.6. In an alternative example, the user can fine tune the split ratio using phantom data or sample data (if available), by reducing the split ratio until the loss counter 26 has a count of zero.

In one example, the splitter 22a can be configured to pass all event data from the coincidence node 21a to the FIFO buffer 23a, which in turn passes the event data to the sweeper 24. When the (positron emission) activity is high, the sweeper 24 may output additional event data while the output buffer 25 is full. Output buffer 25 would not accept the additional event data, until the oldest event data in the output buffer 25 are pushed out to storage medium 12 and/or the image reconstruction circuitry 27, freeing up buffer space in buffer 25. Any additional event data output by the sweeper 24 (before the output buffer 25 is ready to accept another event data) are sent to the loss counter 26. In response to receiving event data, the loss counter 26 increments the number of lost events and discards the event data. The discarded event data are not output nor stored as sinogram data. This scenario accounts for the behavior discussed above with reference to FIG. 1 in the case of block input rate greater than $1.75 \times 10^5$ cps, where the loss count increases rapidly, and the "prompt" and "random" counts become inaccurate In some embodiments, each splitter 22a-22n is configured for passing the predetermined portion of incoming radiation event data and excluding a remainder of the radiation events from the event data output to the buffers 23a-23n. In some embodiments, the predetermined portion of events passed (split ratio) is a constant fraction. For example, in one embodiments, the split ratio can be any multiple of 0.1 (i.e., 0.1, 0.2, 0.3, . . . , 1.0. A number output_qty equal to 10*split ratio can be used, so that for every ten consecutive incoming event data, the first output_qty event data are passed to FIFO buffer 23a, and the remaining 10-output_qty event data are excluded or discarded. Applying this technique, if the split ratio is 0.6, then output_qty=10*0.6=6, for every ten consecutive incoming event data, the first 6 event data are passed to FIFO buffer 23a, and the remaining 4 event data are discarded. The coincidence circuit 15 does not increment the count in loss counter 26 in response to one of the excluded (or discarded) radiation events.

In other embodiments, the predetermined portion (split ratio) can be adjusted dynamically, based on the activity level, so that a larger fraction of events are discarded during periods of high activity, and a smaller fraction of events are discarded during periods of low activity as described in Equations (4) and (5) below. For example, in some embodiments, detector count rate information can be used as an input to select the split ratios. In addition, a special tag word can be used in the listmode file so that the user is notified about the new split ratio values.

$$P_{pass}=S_P(x)*P_{tot} \quad (4)$$

where
$P_{tot}$: total number of prompts before the splitter
$P_{pass}$: number of prompts to be processed after the split ratio is applied (after splitter)
$S_P(x)$: split ratio for prompts as a function of detector count rate, x.

In a similar fashion, $$R_{pass}=S_R(x)*R_{tot} \quad (5)$$

where
$R_{tot}$: total number of randoms before splitter
$R_{pass}$: number of randoms to be processed after the split ratio is applied (after splitter)
$S_R(x)$: split ratio for randoms as a function of detector count rate, x.

In some embodiments, the predetermined portion can include all prompt coincidence events plus a fraction of randoms detected by the splitter 22a. This allows the coincidence circuit 15 to directly measure the actual "prompt" count, and to determine the "random" count by dividing the measured "random" rate by the split ratio. For example, each coincidence node 21a-21n can be configured to output event data for a first set of radiation events (where each of the first set of (prompt) radiation events includes two photons separated by up to a threshold amount of time), and a second set of (random) radiation events (where each of the second set of radiation events includes two photons separated by more than the threshold amount of time) to the corresponding one of the plurality of splitters 22a-22n. Each splitter 22a-22n is configured to output each of the first set of (prompt) radiation events input thereto, and a portion of the second set of (random) radiation events input thereto. The portion is determined by the split ratio.

Each FIFO buffer 23a-23n is configured for storing the event data corresponding to a first predetermined number of radiation events from a respective one of the plurality of splitters. Each FIFO buffer 23a-23n can be implemented using a random access memory or a shift register, for example.

An output buffer 25 is coupled to the plurality of FIFO buffers 23a-23n (e.g., by way of sweeper 24), for receiving, storing and outputting a second predetermined number of the event data from one or more of the plurality of FIFO buffers 23a-23n for image reconstruction. The output buffer 25 is organized as a FIFO buffer. Thus, output buffer 25 can be configured the same as FIFO buffers 23a-23n, or the output buffer 25 can have a different size and/or construction from the FIFO buffers 23a-23n. For example, the FIFO buffers 23a-23n can be implemented in memory with a first buffer size, while output buffer 25 can be implemented as a shift register with a second buffer size different from the first buffer size. To avoid a bottleneck, the second buffer size of output buffer 25 can be larger than the first buffer size of FIFO buffers 23a. The FIFO buffers 23a-23n throttle the input event data from each individual coincidence node 21a-21n to the output buffer 25. The output buffer 25 throttles the total event data rate output from the coincidence circuit 15.

The loss counter 26 includes a circuit for incrementing a count in response to determining that event data from one of the plurality of buffers 23a is available at an input of the output buffer 25, while the output buffer 25 is full. In some embodiments, the split ratio (fraction of events processed) is selected so the count does not exceed a predetermined threshold criterion. The predetermined threshold criterion specifies a maximum ratio between the count and a total number of radiation events in the first set of (prompt) radiation events and the second set of (random) radiation events. For example, the threshold can be zero counts in the loss counter. Alternatively, in other embodiments, the threshold can be dynamically set so the loss count does not exceed a small fraction (e.g., 1%, 2% or 5%) of the true annihilation event count. The split ratio can be dynamically selected so that the predetermined loss threshold criterion is met (based on phantom or available patient data).

In other embodiments, the predetermined threshold criterion specifies a maximum value of the count in the loss counter. The coincidence circuit 15 has at least one buffer 23a capable of storing data characterizing a predetermined number of uncounted radiation events. A number of received-but-uncounted radiation events does not exceed the predetermined number threshold while the counting is performed.

Figure 4:
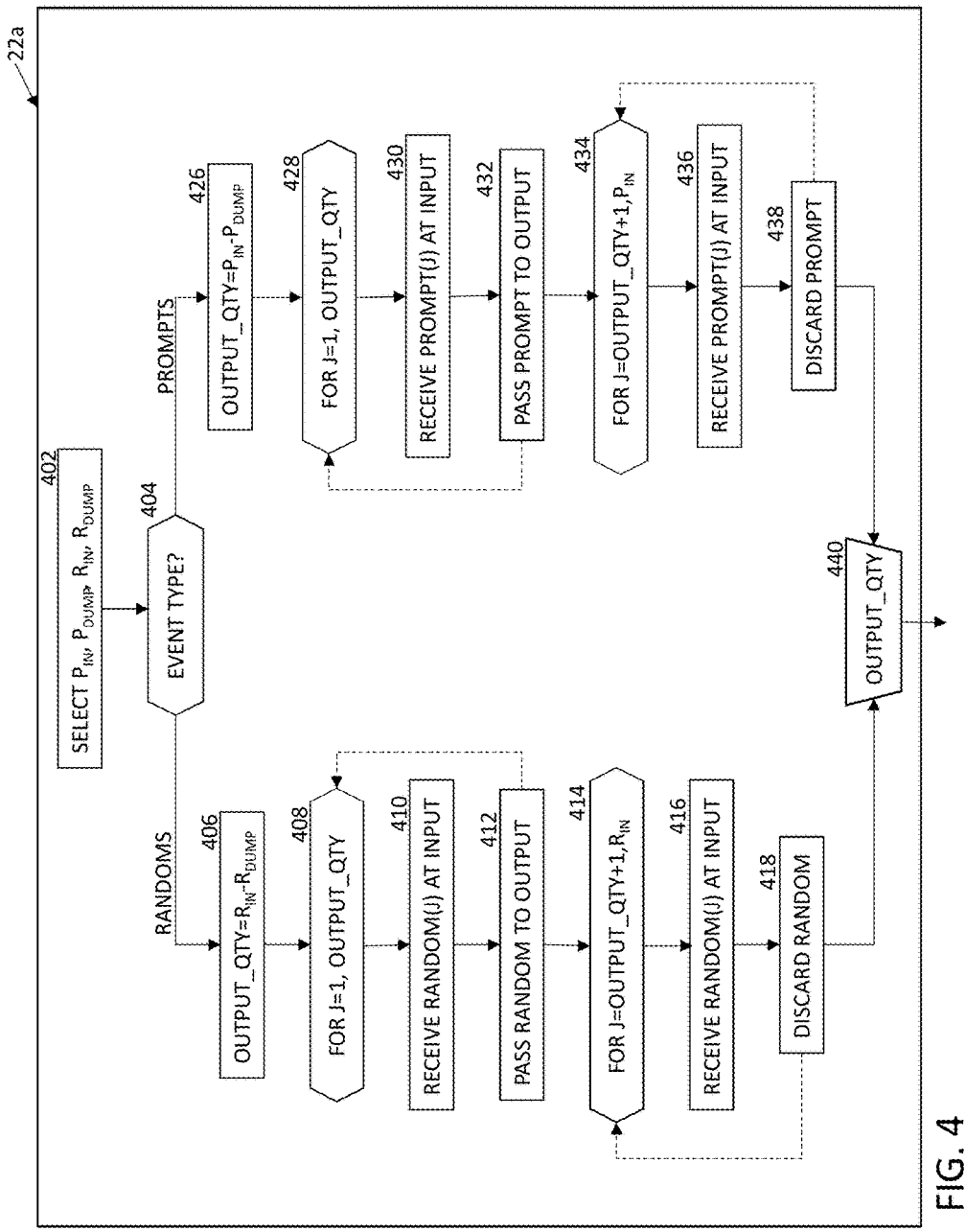
FIG. 4 is a diagram of the splitter of FIG. 3.

FIG. 4 is a block diagram of an exemplary splitter 22a. The splitters 21b-21n can have the same design as the splitter 22a, and for brevity, this description is not repeated. The splitter 22a is capable of operating in either or both of the two modes discussed above. In one mode, a first split ratio defining a predetermined fraction of all prompts and random coincidence events are passed to the FIFO buffer 22a, and the remainder of the prompt and random events are discarded. In another mode, all prompt coincidence events are passed to the FIFO buffer 22a, a second split ratio defining a fraction of all random events are passed to the FIFO buffer 22a, and the remainder of the random events are discarded. The splitter design of FIG. 4 is exemplary, and other splitter variations can be substituted. For example, a splitter (not shown) can have more than two modes of operation.

At block 402, the four parameters $P_{IN}$, $P_{DUMP}$, $R_{IN}$ and $R_{DUMP}$ are input, where $P_{IN}$ is the number of prompts received by splitter 22a, $P_{DUMP}$ is the number of prompts discarded by the splitter, $R_{IN}$ is the number of randoms received by splitter 22a, and $R_{DUMP}$ is the number of randoms discarded by the splitter. The number of true coincidence events received can be calculated as $(P_{IN}-R_{IN})$, and the number of true coincidence events discarded can be calculated as $(P_{DUMP}-R_{DUMP})$. In some embodiments, the inputs can also include a selection of the operating mode, which determines which type(s) of events can be discarded to reduce or eliminate lost events.

In other embodiments, the first and/or second split ratios are dynamically selected based on the block input rate. For example, the non-transitory, machine readable storage medium 12 may contain at table containing a record for each block input rate, where each record includes a first split ratio (for prompts) and a second split ratio (for randoms). Upon detecting the block input rate, the record having the closest block input rate can be determined, and the first and second split ratios in that record are used.

In some embodiments (blocks 426-438), the same predetermined fraction of prompts and randoms are discarded, without any lost events. $P_{IN}$ and $P_{DUMP}$ are determined so that for every $P_{IN}$ prompts received by splitter 22a, $P_{DUMP}$ of the prompts are discarded, ($P_{IN}$–$P_{DUMP}$) of the prompts are passed on to the FIFO buffer 23a, and none of the prompts are lost. Similarly, for every $R_{IN}$ randoms received by splitter 22a, $R_{IN}$–$R_{DUMP}$ of the randoms are passed on to the FIFO buffer 23a, $R_{DUMP}$ of the randoms are discarded, and none of the randoms are lost.

In other embodiments (blocks 406-418), all of the prompt coincidence events are passed on to the FIFO buffer 23a, and for every $R_{IN}$ randoms received, $R_{DUMP}$ randoms are discarded, $R_{IN}$–$R_{DUMP}$ randoms are passed to the FIFO buffer 23a, and there are no lost events. Thus, all of the prompt coincidence events are counted and passed to the FIFO buffer 23a, a predetermined fraction of the randoms are counted, and the remainder of the randoms are discarded.

Although FIG. 4 shows an example in which the number of input events and number of discarded events are input, other embodiments are configured to receive as inputs the number of input events and the number of events passed to the FIFO buffer 23a. Since the number passed to the FIFO buffer 23a is given by the number input minus the number discarded, these input formats provide similar information.

At block 404, the operating mode determines whether equal fractions of all prompts will be discarded, or if all prompts are counted, and only (a fraction of) randoms are discarded. This determination can be determined by a user input identifying the operating mode. Alternatively, the split ratio can be selected based on the block input rate. If all prompts are to be counted, and only randoms are discarded, control passes to block 406. If a fraction of prompts (true and random events) are to be discarded, control passes to block 426.

Blocks 406-418 show the handling of random events by splitter 22a in the case where all prompt events are passed to the FIFO buffer 23a.

At block 406, an output quantity OUTPUT_QTY is determined by subtracting the number of discarded random events $R_{DUMP}$ from the number of random events received by the splitter $R_{IN}$.

At block 408, the loop including blocks 410 and 412 is repeated for the first OUTPUT_QTY input random events.

At block 410, the splitter 22a receives the random event J at the input of the splitter 22a.

At block 412, the splitter 22a passes random event J to the output of the splitter 22a.

At block 414, the loop including blocks 416 and 418 is repeated for the remaining input random events, from event (OUTPUT_QTY+1) to event ($R_{IN}$).

At block 416, the splitter 22a receives the random event J at the input of the splitter 22a.

At block 418, the splitter 22a discards random event J. The random event counter is not incremented for discarded events, and the details of the discarded events (coincidence pair information) are not saved. In some embodiments, a discarded event counter is incremented.

Blocks 426-438 show the process for counting and retaining a predetermined fraction of prompts coincident events, and discarding a predetermined fraction of prompts. At block 426, an output quantity OUTPUT_QTY is determined by subtracting the number of discarded events $P_{DUMP}$ from the number in input events to the splitter $P_{IN}$.

At block 428, the loop including blocks 410 and 412 is repeated for the first OUTPUT_QTY input events.

At block 430, the splitter 22a receives the event J at the input of the splitter 22a.

At block 432, the splitter 22a passes event J to the output of the splitter 22a.

At block 434, the loop including blocks 416 and 418 is repeated for the remaining input events, from event (OUTPUT_QTY+1) to event ($P_{IN}$).

At block 436, the splitter 22a receives the event J at the input of the splitter 22a.

At block 438, the splitter 22a discards event J. In some embodiments, a discarded event counter is incremented, but the "prompts event counters is incremented, and the details of the discarded events (time stamp, receiving detector, voltage) are not saved.

Block 440 outputs the retained prompt and random events (that have not been discarded in block 418 or 438) to the FIFO buffer 23a.

FIG. 4 shows an embodiment of a splitter 22a using first and second split ratios for prompts and randoms, respectively. The splitter 22a is capable of being operated in a mode where the first split ratio (for prompts) equals 1.0 and the second split ratio for randoms is between 0.0 and 1.0. Operated in this manner, the splitter passes all prompts and discards a fraction of randoms. The splitter 22a is also capable of being operated in a mode where the first split ratio and the second split ratio are equal and are between 0.0 and 1.0. Operated in this manner, the splitter passes a common fraction of all prompts and randoms, and discards a common fraction of all prompts and randoms.

Figure 5:
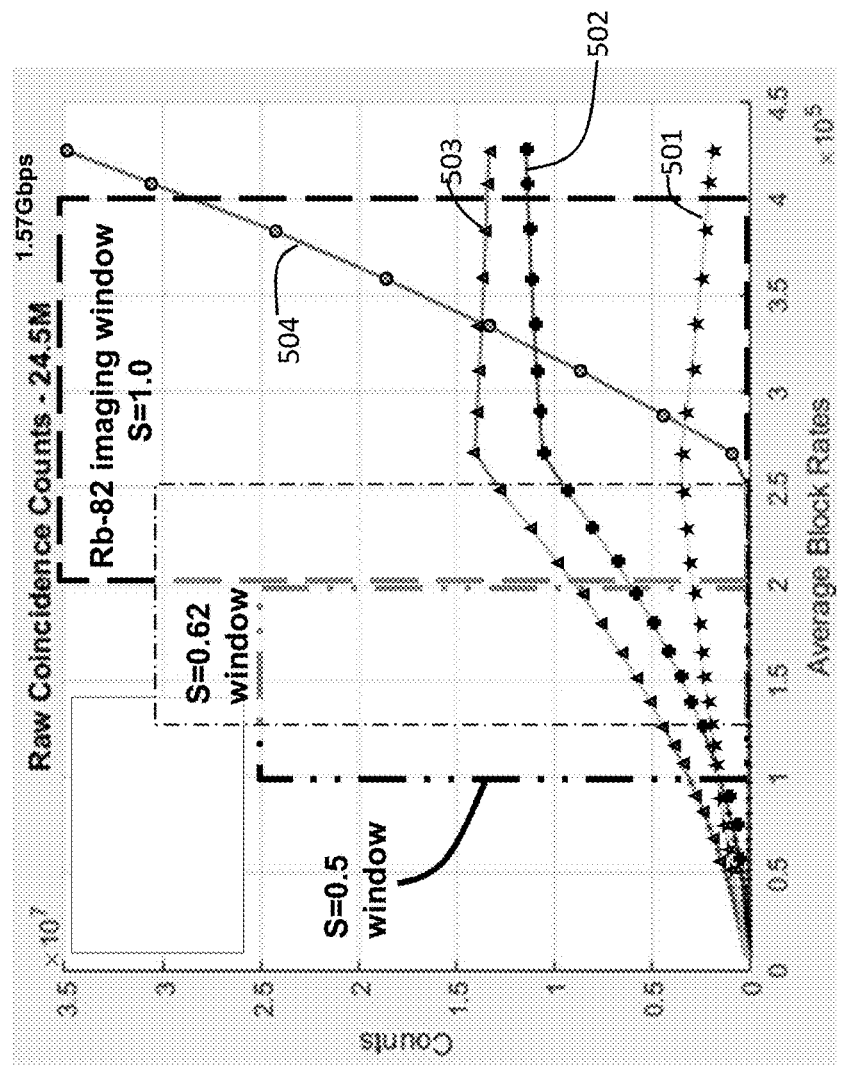
FIG. 5 is a diagram showing count performance of prompts, randoms, trues and loss events for a decaying water cylinder with F18 at 24.5 Mcps data transfer rate, and demonstrating selection of the split ratio for the splitter of FIG. 4.

FIG. 5 is a diagram of the type shown in FIG. 1, including count performances of trues 501, randoms 502, prompts 503 and lost events 504, as a function of the average block rate. Below an average block rate of about $2.5 \times 10^5$ cps, the lost events are substantially zero at 24.5 Mcps data transfer rate. Above an average block rate of $2.5 \times 10^5$ cps, the lost event rate increases sharply. In Rb-82 or O-15 water imaging study, although the average block rates will vary (depending on the scanner geometry and the activity distribution in the field of view), the expected range of average block rates can be between $2.0 \times 10^5$ cps and $4.0 \times 10^5$ cps. Therefore, the coincidence electronics of the scanner will operate in a region in which some of coincidence events may be lost. If the split ratio s=0.5, one of every two event data are counted and one of every two event data are discarded. By using split ratio s=0.5, coincidence circuit 15 will assume that the events are recorded coming between average block rates from $1.0 \times 10^5$ cps to $2.0 \times 10^5$ cps (in reality, the actual block rates for this example are between $2.0 \times 10^5$ cps and $4.0 \times 10^5$ cps). Zero events are lost in the coincidence board with the split ratio s=0.5, but the operating point can be optimized further to maximize the count rate capability of the coincidence circuit. If the split ratio s=0.625, five of every eight event data are counted and three of every eight event data are discarded. 62.5% of the events are recorded with average block rates from $1.25 \times 10^5$ cps to $2.5 \times 10^5$ cps, and essentially zero lost events.

Thus, a split ratio of 0.625 is optimum for this example. Each splitter 22a-22n can be configured to pass five of every eight-event-data and discard the other three of every eight-event-data. When the raw coincidence counts are obtained, all of the counts can be scaled by 1/0.625=1.6 to obtain an accurate estimate of the raw coincidence counts that would be observed by a coincidence circuit having unlimited buffer space (without incurring the higher cost of increased buffer space). For this example, it is assumed that same split ratio is used for both prompts and randoms. However, in other embodiments, two different split ratios can be used for prompts and randoms, respectively.

Figure 6:
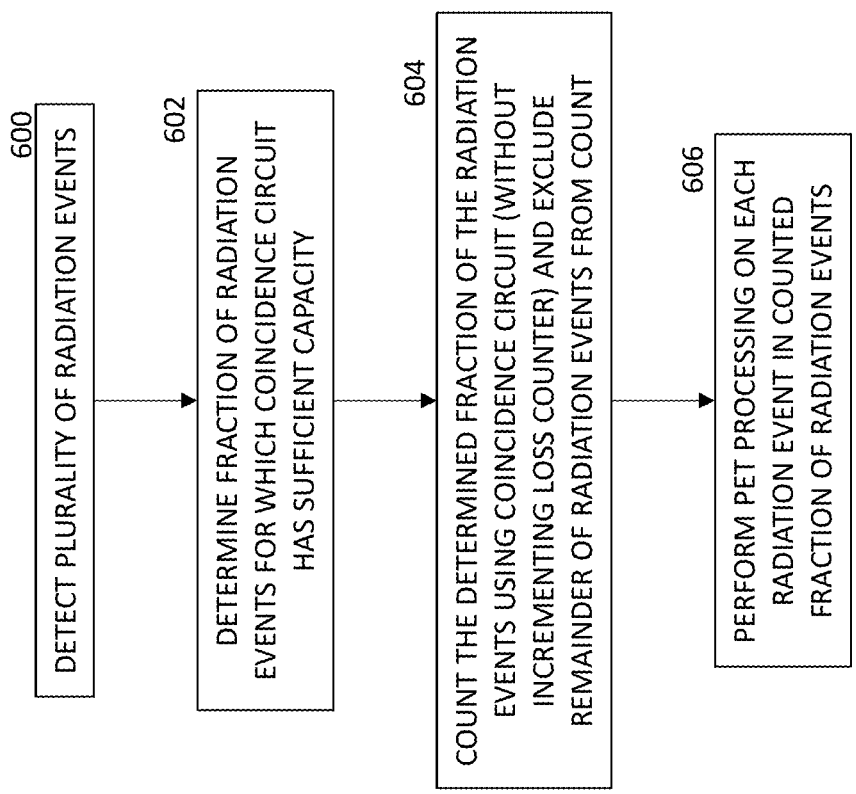
FIG. 6 is a flow chart of a method of coincidence detection reducing or eliminating lost events.

FIG. 6 is a flow chart of an exemplary method of counting coincident events.

At block 600, the coincidence node 600 detects a plurality of radiation events.

At block 602, the fraction of radiation events for which the coincidence circuit has sufficient processing and buffer capacity is determined. This fraction can be used as the split ratio. The ratio can be entered manually, or automatically calculated during a scan, for example. The split ratio can be automatically calculated as the ratio of prompts to (total prompts plus lost events). Once the split ratio is determined, the ratio of prompts/(prompts+lost) can be simplified to its lowest terms (a/b) by dividing both the numerator (prompts) and denominator (prompts+lost) by the largest common divisor (LCD). With the simplified split ratio expressed as a/b, for every b events, a events are counted and passed to the FIFO buffer 23a, and (b-a) events are discarded.

In some embodiments, block 602 includes computing the split ratio based on the block input rate to the coincidence circuit 15. In some embodiments, computing the split ratio includes computing a first split ratio defining the fraction of prompts which are passed to the FIFO buffer 22a (and are not deleted), and computing a second split ratio defining the fraction of randoms which are passed to the FIFO buffer 22a (and are not deleted).

For example, block 602 can set the first split ratio (for prompts) to 1.0, and attempt to select a second split ratio (for randoms) so the FIFO buffer 22a and output buffer 25 do not receive additional events while filled, and the lost counter 26 is not incremented. If this cannot be achieved with the first split ratio equal to 1.0, then block 602 can select a first split ratio (for prompts) that is between 0.0 and 1.0, and a second split ratio for randoms, between 0.0 and 1.0 (where the second split ratio is different from the first split ratio), so the FIFO buffer 22a and output buffer 25 do not receive additional events while filled, and the lost counter 26 is not incremented.

At block 604, the splitter 22a of the coincidence circuit 15 counts the determined fraction a/b of the radiation events and discards the remainder (b-a)/b of the radiation events (without incrementing the loss counter).

At block 606, the processor 7 performs positron emission tomography (PET) processing on each radiation event in the fraction a/b of the plurality of radiation events.

Figure 7:
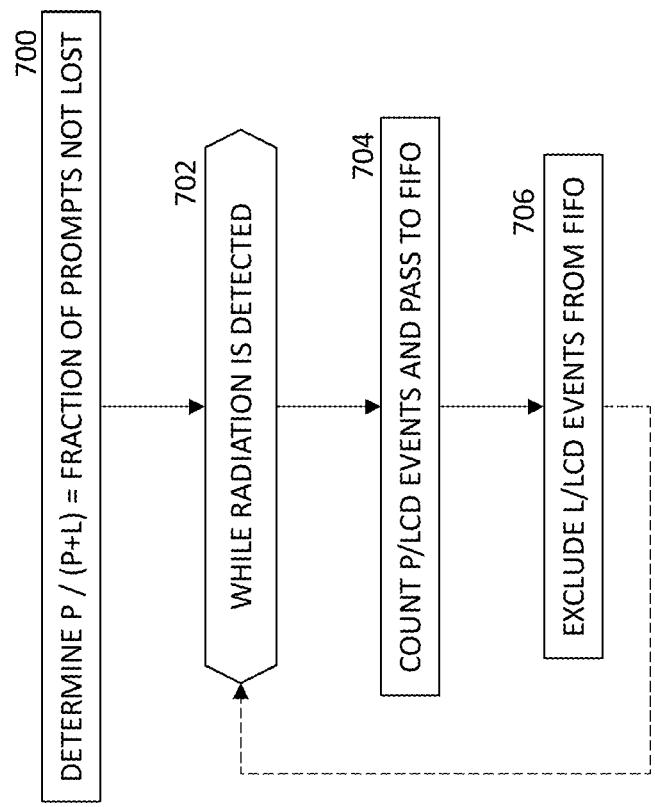
FIG. 7 is a flow chart of a method for determining and implementing discarding of a fraction of prompts detected.

FIG. 7 shows a general method performed in the splitter for both randoms and prompts, operating as described above with reference to Equations (2) to (5). FIG. 7 is a flow chart of a method of passing and discarding event data within the splitter, based on the number of prompt (P) and lost (L) events in a scan (or test scan), wherein the coincidence circuit 15 has a loss counter 26, and the counting is performed on each radiation event in the fraction s of the plurality of radiation events without incrementing the loss counter 26.

At block 700, the split ratios $s_p$ and $s_r$ (fraction of prompts which are not lost) can be calculated as:

$$s_p = P/(P+L)$$

similarly, for randoms $$s_r = R/(R+L)$$

where $s_p$ and $s_r$ can be the same as each other or different from one another.

The numerator P and the denominator (P+L) can both be divided by their largest common divisor (LCD) to simplify the ratios $s_p$ and $s_r$ to their irreducible forms.

At block 702, while radiation is detected (during a scan), the loop containing blocks 704 and 706 is repeated.

At block 704, P/LCD of the input events are counted and their attributes are passed to the FIFO buffer 23a.

At block 706, L/LCD of the input events are discarded and are not passed to the FIFO buffer 23a. The loss counter is not incremented in block 706.

The loop with blocks 704 and 706 is repeated round-robin, so counting the fraction of the plurality of (prompt and random) radiation events and excluding a remainder of the plurality of (prompt and random) radiation events from the counting includes alternating between counting one or more of the plurality of (prompt and random) radiation events and excluding one or more of the plurality of (prompt and random) radiation events. In some embodiments, counting the fraction of the plurality of radiation events and excluding a remainder of the plurality of radiation events from the counting includes interleaving the counting and the excluding.

Figure 8:
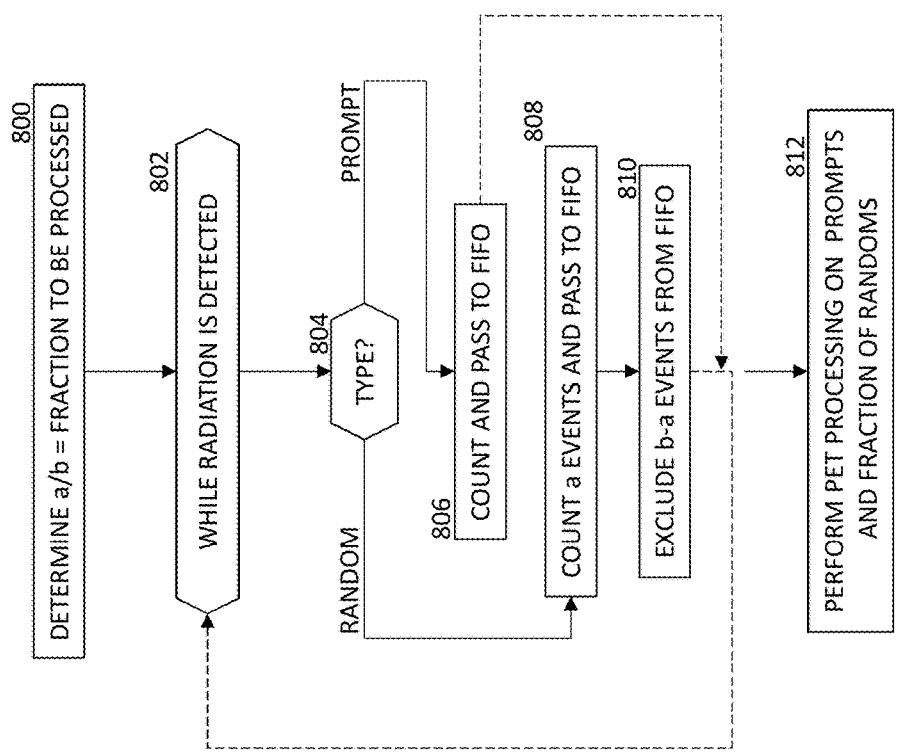
FIG. 8 is a flow chart of a method for keeping all prompts coincidence events and discarding a fraction of random detections.

FIG. 8 is a flow chart of a method in which all prompt coincidence events are counted and passed to the FIFO buffer 22a, and a fraction of the random events are discarded. (This mode of operation can be implemented in the splitter 22a of FIG. 4 by setting the first split ratio for prompts equal to 1.0 and setting the second split ratio for randoms to a fraction between 0.0 and 1.0.) The coincidence circuit 15 has at least one buffer 22a-22n, 25 capable of storing data characterizing a predetermined number of uncounted radiation events. A number of received-but-uncounted radiation events in each individual buffer 22a-22n, 25 does not exceed the predetermined number while the counting is performed.

At block 800, a fraction of random radiation events to be processed is determined. The fraction a/b can be manually input or computed based on a test scan. The fraction is expressed as a proper fraction (between zero and one) and is simplified to irreducible form a/b by dividing both the numerator and denominator by the largest common divisor (LCD), where a and b are both positive integers, and b>a.

At block 802, a loop including blocks 804-810 is repeated while radiation events from the scan are detected. The scanner 10 electronics detect a first set of (prompt) radiation events, including true and random events, each prompt event including two photons separated by up to a threshold amount of time, and a second set of (random) radiation events. The coincidence circuit 15 of the scanner 10 has sufficient buffer capacity 23a-23n, 25 to process each prompt radiation event in the first set of radiation events and the fraction (from block 800) of the second set of random radiation events.

At block 804, the appropriate coincidence node 21a-21n determines whether each event is a prompt (first set) event or a random (second set) event. If the event is a prompt coincidence event, block 806 is executed. If the event is a random event, block 808 is executed.

At block 806, the coincidence circuit 15 counts each prompt event from the first set of (prompt) radiation events.

At block 808, the coincidence circuit 15 counts the fraction of random events from and the second set of (random) radiation events, and passes them to the FIFO buffer 23a-23n. For example, if the fraction is expressed in irreducible form as a/b, then the coincidence circuit 15 counts a random events.

At block 810, the coincidence circuit 15 excludes a remainder of the second set of radiation events from the counting. For example, if the fraction is expressed in irreducible form as a/b, then the coincidence circuit 15 excludes (b-a) random events from being counted or passed to the FIFO buffer 23a-23n. The coincidence circuit has a loss counter, and the counting is performed on each radiation event in the fraction a)/b of the second set of radiation events without incrementing the loss counter.

The loop of blocks 804-810 is repeated, so that counting the fraction of the second set of radiation events and excluding a remainder of the second set of radiation events from the counting includes interleaving the counting and the excluding. In some embodiments, counting the fraction of the (random) second set of radiation events and excluding a remainder of the (random) second set of radiation events from the counting includes alternating between the counting and the excluding.

At block 812, the processor 7 performs positron emission tomography (PET) processing on each (prompt) radiation event in the first set of radiation events and the fraction of the second set of (random) radiation events.

The methods and system described herein may be at least partially embodied in the form of computer-implemented processes and apparatus for practicing those processes. The disclosed methods may also be at least partially embodied in the form of tangible, non-transitory machine readable storage media encoded with computer program code. The media may include, for example, RAMs, ROMs, CD-ROMs, DVD-ROMs, BD-ROMs, hard disk drives, flash memories, or any other non-transitory machine-readable storage medium, wherein, when the computer program code is loaded into and executed by a computer, the computer becomes an apparatus for practicing the method. The methods may also be at least partially embodied in the form of a computer into which computer program code is loaded and/or executed, such that, the computer becomes a special purpose computer for practicing the methods. When implemented on a general-purpose processor, the computer program code segments configure the processor to create specific logic circuits. The methods may alternatively be at least partially embodied in a digital signal processor formed of application specific integrated circuits for performing the methods.

Although the subject matter has been described in terms of exemplary embodiments, it is not limited thereto. Rather, the appended claims should be construed broadly, to include other variants and embodiments, which may be made by those skilled in the art.

What is claimed is:

1. A method comprising:
   determining a fraction of random radiation events to be processed;
   detecting a first set of radiation events, each including two photons separated by up to a threshold amount of time, and a second set of random radiation events, where a coincidence circuit outputs event data corresponding to each radiation event, the coincidence circuit comprising:
      a plurality of splitters, each splitter configured for receiving the event data from a respective one of the plurality of coincidence nodes and outputting the event data corresponding to a fraction of the radiation events;
      a plurality of buffers, each buffer configured for storing the event data corresponding to a first predetermined number of radiation events from a respective one of the plurality of splitters;
      an output buffer coupled to the plurality of buffers, for receiving, storing and outputting a second predetermined number of the event data from one or more of the plurality of buffers for image reconstruction; and
      a circuit for incrementing a count in a loss counter in response to determining that the buffer capacity is full and the event data from one of the plurality of buffers is available at an input of the output buffer, wherein the fraction is selectable so the count does not exceed a predetermined threshold criterion;
      wherein, each of the second set of radiation events including two photons separated by more than the threshold amount of time to the corresponding one of the plurality of splitters, and
      wherein the predetermined threshold criterion specifies a maximum ratio between the count and a total number of radiation events in the first set of radiation events and the second set of radiation events;
   counting the first set of radiation events and the fraction of the second set of random radiation events using the coincidence circuit, and excluding a remainder of the second set of random radiation events from the counting; and
   performing positron emission tomography (PET) processing on each radiation event in the first set of radiation events and the fraction of the second set of random radiation events.

2. The method of claim 1, wherein counting the fraction of the second set of random radiation events and excluding a remainder of the second set of random radiation events from the counting includes interleaving the counting and the excluding.

3. The method of claim 1, wherein counting the fraction of the second set of random radiation events and excluding a remainder of the second set of random radiation events from the counting includes alternating between the counting and the excluding.

4. The method of claim 1, wherein counting the fraction of the second set of random radiation events and excluding a remainder of the second set of random radiation events from the counting includes alternating between counting one or more of the plurality of random radiation events and excluding one or more of the plurality of random radiation events.

5. A coincidence circuit, comprising:
   a plurality of coincidence nodes, each coincidence node coupled to receive respective signals from a respective pair of radiation detectors for detecting a plurality of radiation events, and for outputting event data corresponding to each radiation event based on the received signals;
   a plurality of splitters, each splitter configured for receiving the event data from a respective one of the plurality of coincidence nodes and outputting the event data corresponding to a fraction of the radiation events;
   a plurality of buffers, each buffer configured for storing the event data corresponding to a first predetermined number of radiation events from a respective one of the plurality of splitters;
   an output buffer coupled to the plurality of buffers, for receiving, storing and outputting a second predetermined number of the event data from one or more of the plurality of buffers for image reconstruction; and
   a circuit for incrementing a count in a loss counter in response to determining that the output buffer is full and event data from one of the plurality of buffers is available at an input of the output buffer, wherein the fraction is selectable so the count does not exceed a predetermined threshold criterion;

wherein each coincidence node is configured to output event data for a first set of radiation events, each of the first set of radiation events including two photons separated by up to a threshold amount of time, and a second set of radiation events, each of the second set of radiation events including two photons separated by more than the threshold amount of time to the corresponding one of the plurality of splitters, and wherein the predetermined threshold criterion specifies a maximum ratio between the count and a total number of radiation events in the first set of radiation events and the second set of radiation events.

6. The coincidence circuit of claim 5, wherein each splitter is configured for excluding a remainder of the radiation events from the event data output to the buffers.

7. The coincidence circuit of claim 6, wherein the circuit does not increment the count in response to an excluded radiation events.

8. The coincidence circuit of claim 5, wherein each coincidence node is configured to output event data for each one of the radiation events the coincidence node detects to the corresponding one of the plurality of splitters.

9. The coincidence circuit of claim 5, wherein:

each splitter is configured to output each of the first set of radiation events input thereto, and a portion of the second set of radiation events input thereto.

10. A coincidence circuit, comprising:

a plurality of coincidence nodes, each coincidence node coupled to receive respective signals from a respective pair of radiation detectors for detecting a plurality of radiation events, and for outputting event data corresponding to each radiation event based on the received signals;

a plurality of splitters, each splitter configured for receiving the event data from a respective one of the plurality of coincidence nodes and outputting the event data corresponding to a fraction of the radiation events;

a plurality of buffers, each buffer configured for storing the event data corresponding to a first predetermined number of radiation events from a respective one of the plurality of splitters;

an output buffer coupled to the plurality of buffers, for receiving, storing and outputting a second predetermined number of the event data from one or more of the plurality of buffers for image reconstruction; and a circuit for incrementing a count in a loss counter in response to determining that the output buffer is full and event data from one of the plurality of buffers is available at an input of the output buffer, wherein the fraction is selectable so the count does not exceed a predetermined threshold criterion;

wherein each coincidence node is configured to output event data for a first set of radiation events, each of the first set of radiation events including two photons separated by up to a threshold amount of time, and a second set of radiation events, each of the second set of radiation events including two photons separated by more than the threshold amount of time to the corresponding one of the plurality of splitters, and wherein the predetermined threshold criterion specifies a maximum ratio between the count and a number of radiation events in the first set of radiation events.

11. The coincidence circuit of claim 10, wherein each splitter is configured for excluding a remainder of the radiation events from the event data output to the buffers.

12. The coincidence circuit of claim 11, wherein the circuit does not increment the count in response to an excluded radiation events.

13. The coincidence circuit of claim 10, wherein each coincidence node is configured to output event data for each one of the radiation events the coincidence node detects to the corresponding one of the plurality of splitters.

14. The coincidence circuit of claim 10, wherein each splitter is configured to output each of the first set of radiation events input thereto, and a portion of the second set of radiation events input thereto.

* * * * *